United States Patent [19]

Klingelhofer

[11] Patent Number: 4,596,730

[45] Date of Patent: Jun. 24, 1986

[54] SELF-SUPPORTING COMPOSITE PLATES FOR DOUBLE FLOORS, CEILINGS AND THE LIKE

[75] Inventor: Ulrich Klingelhofer, Waldbüttelbrunn, Fed. Rep. of Germany

[73] Assignee: MERO-Werke Dr. Ing. Max Mengeringhausen GmbH & Co., Wurzburg, Fed. Rep. of Germany

[21] Appl. No.: 682,284

[22] Filed: Dec. 17, 1984

[30] Foreign Application Priority Data

Dec. 16, 1983 [DE] Fed. Rep. of Germany ..... 33456208

[51] Int. Cl.⁴ .............................................. B32B 3/12
[52] U.S. Cl. ........................................ 428/73; 52/806; 428/117; 428/703
[58] Field of Search ................. 428/116, 117, 73, 703; 52/806

[56] References Cited

U.S. PATENT DOCUMENTS

| | | | |
|---|---|---|---|
| 3,106,503 | 10/1963 | Randall et al. | 428/703 X |
| 4,076,880 | 2/1978 | Geschwender | 52/806 X |
| 4,195,746 | 4/1980 | Cottrell | 428/118 X |
| 4,485,919 | 12/1984 | Sandel | 428/167 X |

FOREIGN PATENT DOCUMENTS 2004101 11/1971 Fed. Rep. of Germany .
1338449 11/1973 United Kingdom ............... 428/703

Primary Examiner—Henry F. Epstein
Attorney, Agent, or Firm—Quaintance, Murphy & Presta

[57] ABSTRACT

A self-supporting composite plate for double floors, ceilings or the like, with a pan-shaped outside wrapper member and a hardenable mineral filler, e.g., anhydrite, which can be introduced in liquid state into the pan-shaped wrapper member, and in which are embedded lightweight construction materials. The construction materials are substantially spherical bodies that are retained in a predetermined distribution essentially in the area of the statically neutral zone of the composite plate by a latticed holder that is provided within the wrapper member.

10 Claims, 3 Drawing Figures

FIG. 1
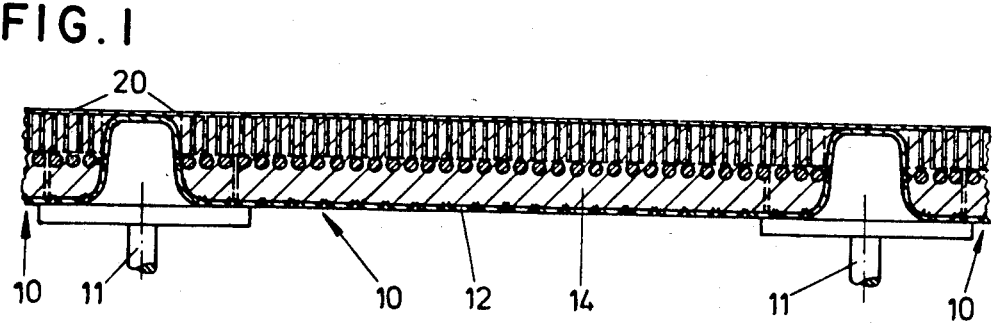
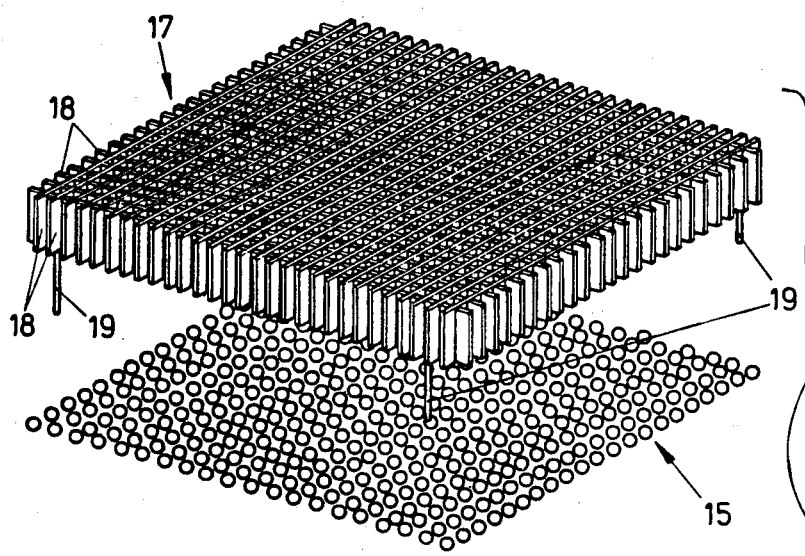
FIG. 2
FIG. 3
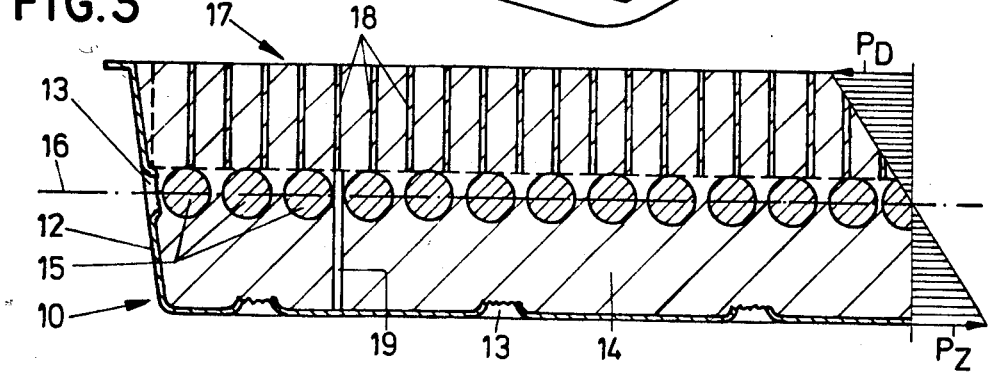

SELF-SUPPORTING COMPOSITE PLATES FOR DOUBLE FLOORS, CEILINGS AND THE LIKE

BACKGROUND OF THE INVENTION

The present invention relates to a self-supporting composite plate for double floors, ceilings or the like, with a pan-shaped outside wrapper member and a hardenable mineral filler, e.g., anhydrite, which is introduced in liquid state into the pan-shaped wrapper member, and in which are embedded light construction materials in order to minimize weight.

A self-supporting composite plate of this type is known from German Pat. No. 2 004 101. Wood-reinforced concrete is one example of a mineral pan-filling material containing light construction materials, which is obtained by mixing wood fibers with liquid concrete in such a manner that the wood fibers are distributed substantially uniformly in the hardened concrete. The drawback of a composite plate with such a pan-filling material is that it is of insufficient strength and bending resistance for many uses. Also, the use of wood-reinforced concrete as a pan filling material leads to finished composite plates of low fire-resistance.

In concrete technology, it is generally known to embed light construction elements, e.g., of expanded clay, in concrete elements for weight reduction. When this method is used for the construction of a self-supporting composite plate of the aforementioned type, the great danger arises that the relatively light expanded clay bodies or the like will accumulate in the same area of the liquid mineral filler material, e.g., anhydrite, following its introduction into the pan-shaped wrapper member. Because of the relatively high degree of buoyancy common to this material, all of the filler particles accumulate in the top area and are embedded there. This results in diminished strength, particularly on the filler material surface, and reduced bending resistance in comparison to a composite plate with a homogenous anhydrite filling.

SUMMARY OF THE INVENTION

Therefore, an object of the invention is a self-supporting composite plate which has strength and bending resistance along with considerable reduction of weight which practically corresponds to that of a composite plate with a homogenous mineral filler (e.g., anhydrite).

This is attained according to the invention in that the light construction materials are spherical or almost spherical bodies arranged essentially in the area of the statically neutral zone of the composite plate, and a latticed or reticular holder is provided for positioning of the light construction bodies in the liquid mineral filler material, distributed as desired during the introduction into the pan-shaped wrapper member and forced to float in this statically neutral zone.

The great strength and bending resistance with simultaneous considerable weight reduction required of the composite plate in comparison to composite plates with homogenous anhydrite filler is obtained in that the light construction bodies are arranged essentially only in the zone which, when the plate is loaded, bulges out in deviation from the geometry of the stress distribution. The problem of positioning the light construction bodies in the statically neutral zone when they have a tendency to rise or float in the liquid mineral filler is advantageously solved in the simplest manner by the latticed or reticular and lightweight holder. Thus it is to be assumed that the dimensions of this holder are smaller than the smallest diameter of the light construction bodies. The latticed or reticular holder for the light construction bodies is finally likewise embedded in the mineral filler and cooperates with the composite plate following its hardening to improve the strength in the top part (pressure area) of the plate. The holder thus fills an added function, namely, as a traditional reinforcement lattice for composite concrete plates.

One refinement of the invention resides in that the holder is supported at the edges and/or over spacers on the floor of the pan-shaped wrapper member. The finishing process is thus simplified, because, after the light construction bodies have been introduced in sufficient number into the pan-shaped wrapper member, the holder need only be inserted therein and the wrapper filled with the liquid mineral, e.g., anhydrite.

According to another refinement of the invention, if the latticed holder is manufactured of flat rods of light metal, a mineral material or nonflammable pasteboard arranged on edge, on the one hand an inherently more stable (inherently rigid) holder is produced, which can position the light construction bodies reliably in the statically neutral zone and, on the other hand, the high degree of fire resistance of the composite plate which is likewise required is not prejudiced by the holder.

According to still another refinement of the invention, it is advisable that the latticed holder be of such total height that its top terminates flush with the top of the mineral filler or the composite plate. The holder thus advantageously also conveys an increase in strength and stability to the surface of the hardened filler, to which the traditional ceiling covering can then be attached by adhesive or the like.

Still another refinement of the invention is that the light construction bodies are of expanded clay or pumice grit. Such light construction bodies thus add to the fire resistance of the composite plate, and they are also relatively low-cost and do not add greatly to the cost of the composite plate.

BRIEF DESCRIPTION OF THE DRAWINGS

The invention is explained hereinafter relative to the drawings of an exemplary embodiment. They show:

FIG. 1 is a side elevational view in section of a double floor with self-supporting composite plates constructed in accordance with the principles of the present invention;

FIG. 2 is an exploded view of the composite plate of FIG. 1 without the mineral filler; and FIG. 3 is an enlarged partial side elevational view in section of one of the composite plates of FIG. 1, with an indication at one end thereof of the stress distribution when the composite plate is loaded.

DESCRIPTION OF THE PREFERRED EMBODIMENTS

The double floor shown in FIG. 1 comprises square, self-supporting composite plates 10, which are mounted at the four corners on foot supports 11, which rest in turn on the building floor (not shown). Each composite plate 10 has an outside pan-shaped wrapper member 12, preferably formed of a thin sheet of steel which is coated on both sides with an anti-corrosive coating. Rows of openings 13 with inwardly projecting, frayed edges are provided on the floor and on the side walls of the wrapper member 12. The openings 13 with inwardly projecting, frayed edges help to reinforce the connection between the hardened mineral filler 14, e.g., anhydrite, and the pan-shaped wrapper member 12. Mineral filler 14 is introduced into wrapper member 12 in liquid state by any suitable method such as the methods described in German Pat. No. 2 004 101.

To obtain a weight savings of, e.g., 10 to 20% in comparison with composite plates with a homogenous filling of the pan-shaped wrapper member, e.g., of anhydrite, a predetermined quantity of spherical light construction bodies 15, e.g., of expanded clay or pumice grit is mixed into the liquid anhydrite. These light construction bodies 15 do not weaken the strength and bending resistance of composite plate 10 if they are arranged according to the invention in a layer in the statically neutral zone 16 of composite plate 10, as is shown diagrammatically in FIG. 3. The quantity of light construction bodies 15 required for the formation of this layer can thus be determined simply by experimentation.

Light construction bodies 15 can be distributed uniformly in pan-shaped wrapper member 12 before introduction of liquid mineral filler 14, and they have the tendency to rise or float up to the surface in the still slightly liquid filler 14 following filling of pan-shaped wrapper member 12. To overcome this, and to position the light construction bodies 15 in the statically neutral zone 16 of composite plate 10, while filler 14 is still in a liquid state, a lightweight latticed holder 17 is provided in a preferred embodiment. The holder 17 comprises numerous intersecting strips 18 of nonflammable pasteboard. Flat rods of light metal or a mineral material could also be used, instead of the strips of pasteboard. The outside dimensions of holder 17 are such that it is supported on the edge of the pan-shaped wrapper member 12 and also over four spacers 19 on the floor of the wrapper member 12. Holder 17 preferably is of such height that its top terminates flush with that of composite plate 10.

Holder 17 can be inserted either before or after filling of liquid mineral filler 14 into the pan-shaped wrapper member 12, and in either case the liquid filler 14 penetrates into the hollow spaces of holder 17 and fills it entirely. Thus it is obvious that the dimensions of the hollow spaces of holder 17 must be smaller than the smallest diameter of a particle of light construction bodies 15, which, as a result of their buoyancy in the still liquid filler 14, engage on the bottom of holder 17, as shown in FIG. 3. Latticed holder 17 is arranged on edge, and intersecting strips of pasteboard could also be used advantageously in the above described arrangement to provide an increase in strength and stability of the surface of hardened filler 14, e.g., of anhydrite. A covering 20 (FIG. 1), e.g., a rug or carpet pad, can be fastened to the plate surface following hardening of filler 4.

FIG. 3 is a side view showing the stress distribution when composite plate 10 is loaded, wherein the pressure load is PD and the tensile load on the plate is PZ and runs through the intersecting point between the pressure and traction area of the statically neutral zone 16.

Instead of holder 17 used in the heretofore described exemplary embodiment, other perforated holders such as a reticular holder (not shown) could be used. As an illustrative embodiment, a reticular holder could consist of a lightweight frame, e.g., of plastic tubes and flexible plastic gauze, which is fastened to the frame in stretched-out state. Such a reticular holder would be embedded in filler 14 at a suitable distance from the top of the plate. A thin apertured plate of light metal could also be provided as a holder for light construction bodies 15. Such alternate holder constructions are intended to be covered by the term "latticed" as used in the specification and claims of the present application.

I claim:

1. A self-supporting composite plate for double floors, ceilings or the like, with a pan-shaped outside wrapper member and a hardenable mineral filler, e.g., anhydrite, which can be introduced in liquid state into the pan-shaped wrapper member, and in which are embedded lightweight bouyant construction materials, characterized in that the lightweight construction materials are substantially spherical bodies (15) found essentially in the area of the statically neutral zone (16) of composite plate (10), and a latticed holder (17) is provided within the wrapper member for positioning the construction bodies (15) in a predetermined distribution in the liquid mineral filler (14) in the pan-shaped wrapper member, whereby said spherical bodies are forced to float in the statically neutral zone (16) in engagement with the undersurface of said holder, said holder having apertures therethrough that are of a size smaller than said spherical bodies (15) and to allow the mineral filler to flow therethrough.

2. Composite plate as in claim 1, characterized in that the holder (17) is supported at its edges by spacers (19) above the floor of pan-shaped wrapper member (12).

3. Composite plate as in claim 1, characterized in that the holder (17) is formed of substantially flat rods of light metal.

4. Composite plate as in claim 1, characterized in that the holder (17) is formed of a mineral material.

5. Composite plate as in claim 1, characterized in that the holder (17) is formed of nonflammable pasteboard arranged on edge.

6. Composite plate as in claim 1, characterized in that the latticed holder (17) is of such height that its top terminates substantially flush with that of the mineral filler (14) of composite plate (10).

7. Composite plate as in claim 1, characterized in that said construction bodies (15) are formed of expanded clay.

8. Composite plate as in claim 1, characterized in that the latticed holder has a frame to which a perforated flexible gauze is fastened in a stretched-out state.

9. Composite plate as in claim 1, characterized in that the latticed holder comprises an apertured plate.

10. Composite plate as in claim 1, characterized in that said construction bodies (15) are formed of pumice grit.

* * * * *